United States Patent
MacMullan et al.

(10) Patent No.: US 7,394,875 B2
(45) Date of Patent: Jul. 1, 2008

(54) BEAULIEU SERIES APPROACH TO OPTIMAL UMTS RACH PREAMBLE DETECTION ESTIMATION

(75) Inventors: Samuel J. MacMullan, Carlisle, MA (US); Oguz Tanrikulu, Wellesley, MA (US); Frank C. Livingston, Woburn, MA (US); Arnon A. Friedmann, Hopkinton, MA (US)

(73) Assignee: Texas Instruments Incorporated, Dallas, TX (US)

( * ) Notice: Subject to any disclaimer, the term of this patent is extended or adjusted under 35 U.S.C. 154(b) by 534 days.

(21) Appl. No.: 11/109,208

(22) Filed: Apr. 18, 2005

(65) Prior Publication Data
US 2005/0254604 A1   Nov. 17, 2005

Related U.S. Application Data

(60) Provisional application No. 60/562,867, filed on Apr. 16, 2004.

(51) Int. Cl.
*H04L 27/06* (2006.01)
(52) U.S. Cl. .................. 375/340; 375/238; 375/242; 375/256; 375/286; 375/353; 329/311; 455/130
(58) Field of Classification Search ............. 375/340, 375/238, 242, 256, 286, 353; 329/311; 455/130
See application file for complete search history.

(56) References Cited

U.S. PATENT DOCUMENTS

| 2003/0072397 A1* | 4/2003 | Kim et al. | 375/347 |
| 2004/0184421 A1* | 9/2004 | Hondo | 370/329 |
| 2005/0047347 A1* | 3/2005 | Lee et al. | 370/241 |
| 2005/0047530 A1* | 3/2005 | Lee et al. | 375/343 |
| 2005/0259621 A1* | 11/2005 | Lee | 370/335 |

OTHER PUBLICATIONS

Statistical Estimation Of The Cumulative Distribution Function For Power Dissipation In VLSI Circuits☐☐Chih-Shun Ding; Qing Wu; Cheng-Ta Hsieh; Pedram, M.;☐☐Design Automation Conference, 1997. Proceedings of the 34th☐☐Jun. 9-13, 1997 pp. 371-376☐☐.*

* cited by examiner

*Primary Examiner*—Shuwang Liu
*Assistant Examiner*—Michael R Neff
(74) *Attorney, Agent, or Firm*—Robert D. Marshall, Jr.; W. James Brady; Frederick J. Telecky, Jr.

(57) ABSTRACT

A method for preamble detection in mobile unit to base unit wireless telephony sets a preamble detection threshold based upon a Beaulieu series computation dependent upon preamble correlation data. This preamble detection threshold adjusts for noise by assuming the noise is additive White Gaussian noise (AWGN) with a known variance. The method determines the threshold for achieving a probability of false detection of the preamble from noise input of less than 0.001.

5 Claims, 5 Drawing Sheets

BEAULIEU SERIES APPROACH TO OPTIMAL UMTS RACH PREAMBLE DETECTION ESTIMATION

CLAIM OF PRIORITY

This application claims priority under 35 U.S.C. 119(e) from U.S. Provisional Application 60/562,867 filed Apr. 16, 2004.

TECHNICAL FIELD OF THE INVENTION

The technical field of this invention is determining the detection threshold for preamble detection for mobile telephone users for connection to a UMTS base-station receiver.

BACKGROUND OF THE INVENTION

One major challenge in RACH preamble detection is the determination of the detection threshold. A power estimator (PE) can be used to estimate the input noise variance. This PE based technique assumes that the signal-to-noise ratio is low enough so that what is measured by PE is just the interference plus the noise level. This approach works well and converges in a few slots in low-to-moderate signal-to-noise ratio (SNR) environments. Dynamic range adjusters (sliders) in PE may accidentally not be set the same as those in preamble detector (PD). The software complexity increases if we need to pass PE values for use in PD and path monitor (PM) algorithms. Finally, in high SNR scenarios, the PE noise estimate will be strongly influenced by the preamble itself.

Another existing approach to this problem configures a preamble correlation hardware block with a scrambling code that is not used by the mobiles in the particular cell or sector of concern. This requires additional hardware that is used wastefully. Furthermore, the estimation of the detection threshold is still not resolved.

SUMMARY OF THE INVENTION

This invention uses statistics derived with Beaulieu's method to determine the detection threshold assuming input additive white Gaussian noise (AWGN) with known variance. Prior methods use the PE to estimate the input noise variance. However, it is preferable to use the PD itself to characterize the noise variance. For one, this would capture the impact of the PD hardware such as bit-widths. In high SNR scenarios, the orthogonality of the PRACH signatures may allow a more accurate estimate of the noise.

In a typical wireless 3G scenario, there will be free signatures. Thus for a given PRACH scrambling code not all of the 16 signatures will be assigned to users. This invention is an approach to estimate the input noise variance directly from PD outputs if signatures are free. An alternative technique based on PE may be used when no signatures are free. Simulations show that the error using this method is small even using just a few PD output observations. There is a 95% confidence that the fractional error is 2% using just 6 sets of PD outputs.

The PE based approach of the prior art assumes that the signal-to-noise ratio is low enough so that what is measured by PE is just the interference plus noise. This inherent assumption limits the operation range of the preamble detector. In this invention the PE and the preamble correlations are computed separately. Therefore results from PE need to be mapped to whatever configuration is used for the preamble correlations. Convergence speed of the threshold statistic computed according to this invention is much faster than the PE based solution.

BRIEF DESCRIPTION OF THE DRAWINGS

These and other aspects of this invention are illustrated in the drawings, in which.

DETAILED DESCRIPTION OF PREFERRED EMBODIMENTS

Preamble detection is the first step in the wireless telephone base station sorting out the signals from plural wireless telephone users. The base station must determine which received radio transmission corresponds to which user. This determination is necessary to apply the proper signal conditioning such as echo cancellation. This determination also permits the base station to route a recovered voice stream to the counterpart party to a particular wireless telephone user.

Setting a preamble detection threshold is crucial to proper detection. A too high threshold would prevent detection of some valid preambles corresponding to valid radio transmissions. If the threshold is set too low, then there is an increased chance of a false positive preamble detection from received noise. Setting the preamble detection threshold thus involves a compromise between missing too many proper transmissions and making too many false determinations.

Figure 1:
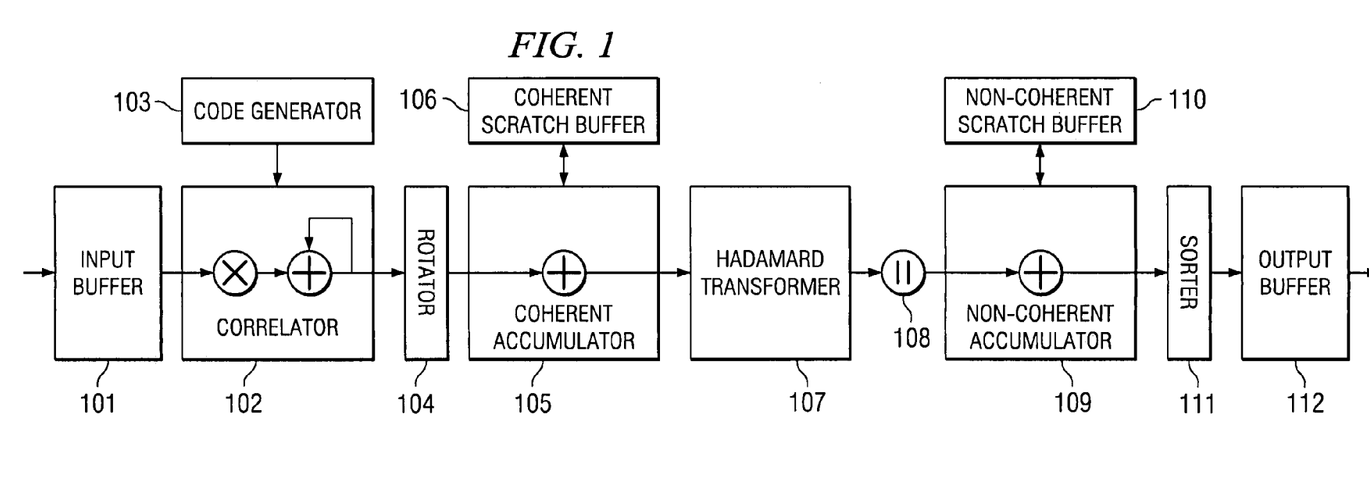
FIG. 1 illustrates a block diagram of a preamble detector.

FIG. 1 illustrates an example preamble detector (PD) that supports the detection of preambles on the PRACH. Within a predefined search window, the PD stores the 16 largest detection results and the associated offsets for each of the 16 signatures. An offset step size of ½ or 1 chip can be used. The PD passes these results to a chip rate assist (CRA) digital signal processor (DSP). The chip rate assist DSP determines if a preamble is present, acknowledges its detection and programs the finger despreader (FD) and path monitor (PM) accordingly.

Input buffer 101 receives the detected radio frequency signals as 8-bit I/Q signals. Input buffer 101 preferably has the capacity to store 1408 samples of each of 12 data streams of 2 times OSF 8-bit I/Q data per sample. Input buffer 101 supplies 64 chips to correlator 102. Correlator 102 correlates the 64 chips from input buffer 101 with PRACH scrambling codes from code generator 103. Correlator 102 preferably performs 2048 simultaneous 64-chip correlations.

Suppose $x_n$ and $y_n$ model the respective in-phase and quadrature input of additive White Gaussian noise (AWGN) samples, each having zero mean with variance $$\frac{\sigma_n^2}{2}.$$

Then let $X_{n,ca}$ and $Y_{n,ca}$ model the coherent accumulation of $x_n$ and $y_n$ respectively over $N_{ca}$ chips. $X_{n,ca}$ and $Y_{n,ca}$ are also Gaussian with mean zero and variance $$\frac{\sigma_{n,ca}^2}{2} = N_{ca}\frac{\sigma_n^2}{2}.$$

The PD forms the absolute value of the coherent accumulation via rotator 104, coherent accumulator 105, coherent scratch memory 106 and Hadamard transformer 107. Rotator 104 preferably has a range of ±30 kHz in steps of 60 Hz. Coherent accumulator 105 employs coherent scratch buffer 106 to store intermediate results. Coherent scratch buffer 106 preferably has a capacity of 32,768 32-bit data words. Coherent accumulator 105 provides an output dynamic range selection to Hadamard transform 107. The result $Z_{n,ca} = \sqrt{X_{n,ca}^2 + Y_{n,ca}^2}$ has Rayleigh distribution with mean $$m_{Z_{n,ca}} = \frac{\sigma_{n,ca}^2}{2}\sqrt{\frac{\pi}{2}} = \frac{N_{ca}\sigma_n^2}{2}\sqrt{\frac{\pi}{2}}$$

and variance $$\sigma_{Z_{n,ca}}^2 = \left(2 - \frac{\pi}{2}\right)\frac{\sigma_{n,ca}^2}{2} = \left(2 - \frac{\pi}{2}\right)\frac{N_{ca}\sigma_n^2}{2}.$$

The PD then non-coherently combines $\hat{N}_{nca}$ coherent packets $Z_{n,ca}$ via non-coherent accumulator 109 and non-coherent scratch buffer 110. As coherent scratch buffer 106, non-coherent scratch buffer 110 preferably has a capacity of 32,768 32bit words. This forms $$Z_{n,nca} = \sum^{\hat{N}_{nca}} Z_{n,ca} = \sum^{\hat{N}_{nca}} \sqrt{X_{n,ca}^2 + Y_{n,ca}^2}.$$

It is convenient to normalize the non-coherent output by $$\frac{\sigma_{n,ca}}{\sqrt{2}}$$

yielding $$\tilde{Z}_{n,nca} = \frac{\sqrt{2}\, Z_{n,nca}}{\sigma_{n,ca}}.$$

The results of non-coherent accumulator 109 are sorted via sorter 111 and output via output buffer 112. Output buffer 112 preferably has a capacity of 2048 32-bit words.

The next section describes a Beaulieu series approach to determine the statistics of $\tilde{Z}_{n,nca}$. Let $X_i$, i=1 to L be independent Rayleigh variables with probability density function (pdf) given by:

$$f_{X_i}(x_i) = \begin{cases} \frac{x_i}{\sigma_i^2}e^{-x_i^2/2\sigma_i^2}, & x \geq 0 \\ 0, & \text{otherwise} \end{cases}$$

where $(2-\pi/2)\sigma_i^2$ is the variance of the distribution.

Denote the sum of the L Rayleigh variables by $$X = \sum_{i=1}^{L} X_i$$

the complementary distribution $G_x(x)$, cumulative distribution $F_x(x)$, and probability density function $f_x(x)$. Then:

$$G_x(\varepsilon L) = \frac{1}{2} + \frac{2}{\pi}\sum_{\substack{n=1 \\ n\,odd}}^{\infty} \frac{(A_{in})^L \sin(L\theta_{in})}{n} \quad (1)$$

with $$A_{in} = \sqrt{\left[{}_1F_1\left(1, \frac{1}{2}, \frac{-n^2\omega^2\sigma_i^2}{2}\right)\right]^2 + \frac{\pi}{2}n^2\omega^2\sigma_i^2 e^{-n^2\omega^2\sigma_i^2}} \quad (2)$$

$$\theta_{in} = \tan^{-1}\left\{\frac{\frac{\pi}{2}n^2\omega^2\sigma_i^2 e^{-n^2\omega^2\sigma_i^2}\cos(n\omega\varepsilon) - {}_1F_1\left(1, \frac{1}{2}, \frac{-n^2\omega^2\sigma_i^2}{2}\right)\sin(n\omega\varepsilon)}{{}_1F_1\left(1, \frac{1}{2}, \frac{-n^2\omega^2\sigma_i^2}{2}\right)\cos(n\omega\varepsilon) + \frac{\pi}{2}n^2\omega^2\sigma_i^2 e^{-n^2\omega^2\sigma_i^2}\sin(n\omega\varepsilon)}\right\} \quad (3)$$

where ${}_1F_1(.,.,.)$ is the confluent hypergeometric function and $\Phi$ is a term affecting the convergence rate of $G_x(\varepsilon L)$.

Denote the $i^{th}$ largest normalized PD output in a single antenna search window of W as $(\tilde{Z}_{n,nca})_i$. Ding, C-S, et al., "Statistical Estimation of the Cumulative Distribution Function for Power Dissipation in VLSI Circuits," Proceedings of the 34th Design Automation Conferences, Jun. 9-13, 1997, pp. 371-376 then shows that these ordered statistics have a power dissipation function given by:

$$p((\tilde{Z}_{n,nca})_i = z) = \frac{n!}{(i-1)!(n-1)!}\left(F_{\tilde{Z}_{n,nca}}(z)\right)^{n-i}\left(G_{\tilde{Z}_{n,nca}}(z)\right)^{i-1} f_{\tilde{Z}_{n,nca}}(z) \quad (4)$$

Figure 2:
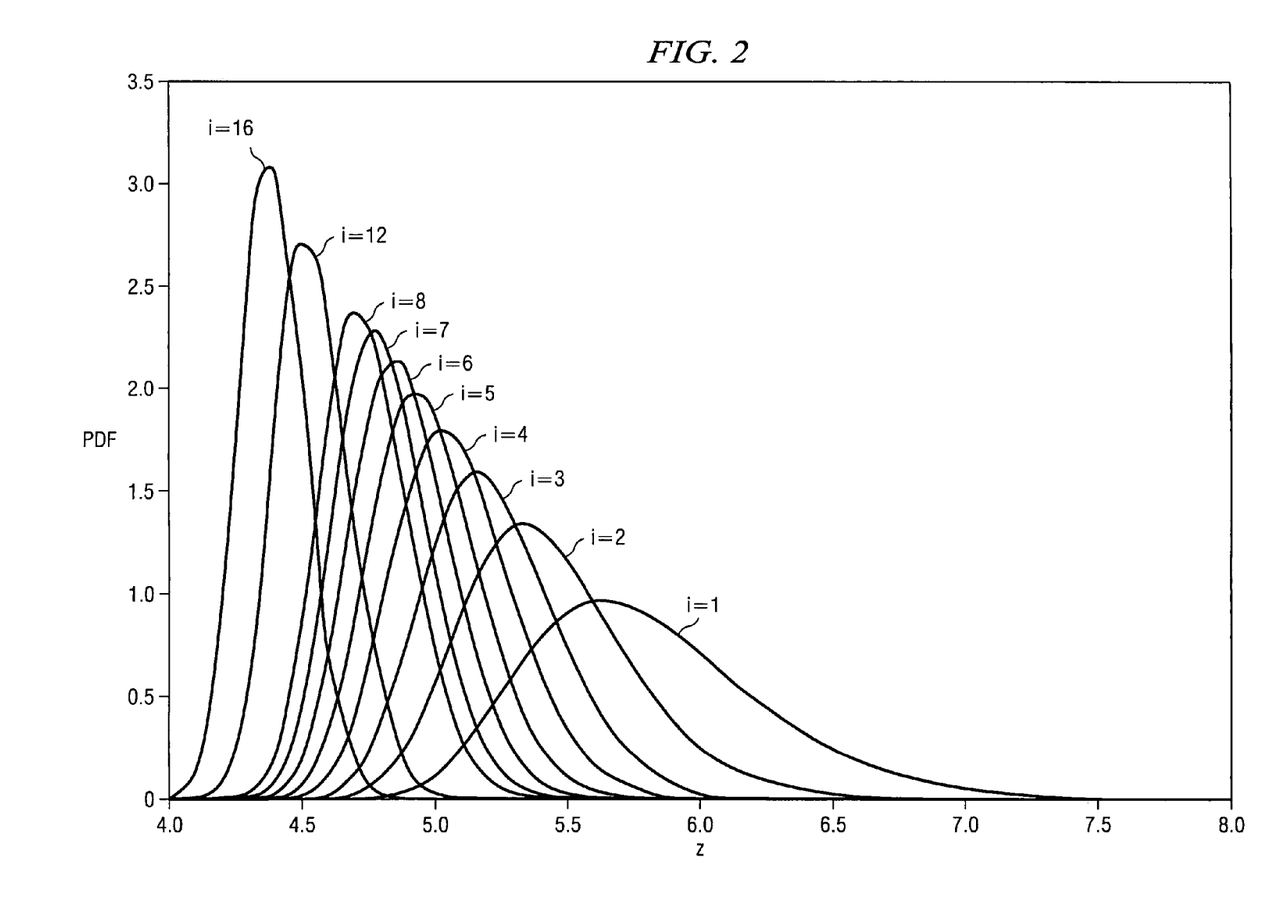
FIG. 2 illustrates a graph of the probability density function versus z for $\hat{W}=512$ and $\hat{N}_{nca}=2$ and several values of i.

$p((\tilde{Z}_{n,nca})_i=z)$ and the expected value $E((\tilde{Z}_{n,nca})_i)=\xi_{i,W,\hat{N}_{nca}}$ can be derived numerically for any value of $\hat{W}$, $\hat{N}_{nca}$ and i by setting $\sigma_i^2=1$ in Equations 1 to 3 and using the results in Equation 4. FIG. 2 illustrates the probability density function $p((\tilde{Z}_{n,nca})_i=z)$ versus z for $\hat{W}=512$ and $\hat{N}_{nca}=2$ and several values of i. Table 1 provides $\xi_{i,W,\hat{N}_{nca}}$ for $\hat{W}=512$ and $\hat{W}=1024$ and several values of $\hat{N}_{nca}$.

TABLE 1

| | $\hat{W}= 512$ | | | | $\hat{W}= 1024$ | | | |
|---|---|---|---|---|---|---|---|---|
| | $\hat{N}_{nca} = 1$ | $\hat{N}_{nca} = 2$ | $\hat{N}_{nca} = 4$ | $\hat{N}_{nca} = 8$ | $\hat{N}_{nca} = 1$ | $\hat{N}_{nca} = 2$ | $\hat{N}_{nca} = 4$ | $\hat{N}_{nca} = 8$ |
| 1 | 3.667330 | 5.778324 | 9.477385 | 16.161117 | 3.864348 | 6.038004 | 9.821462 | 16.620744 |
| 2 | 3.376443 | 5.394726 | 8.968832 | 15.481237 | 3.585999 | 5.671316 | 9.335858 | 15.972554 |
| 3 | 3.221183 | 5.189702 | 8.696589 | 15.116448 | 3.438471 | 5.476691 | 9.077762 | 15.627374 |
| 4 | 3.113599 | 5.047540 | 9.507629 | 14.862889 | 3.336718 | 5.342364 | 8.899480 | 15.388651 |
| 5 | 3.030589 | 4.937802 | 8.361650 | 14.666792 | 3.258494 | 5.239050 | 8.762274 | 15.204764 |
| 6 | 2.962647 | 4.847953 | 8.242052 | 14.505987 | 3.194668 | 5.154723 | 8.650226 | 15.054484 |
| 7 | 2.904924 | 4.771599 | 8.140357 | 14.369148 | 3.140590 | 5.083256 | 8.555224 | 14.926984 |
| 8 | 2.854606 | 4.705025 | 8.051642 | 14.249691 | 3.093565 | 5.021097 | 8.472561 | 14.815983 |
| 9 | 2.809909 | 4.645877 | 7.972784 | 14.143442 | 3.051888 | 4.965997 | 8.399259 | 14.717503 |
| 10 | 2.769633 | 4.592568 | 7.901681 | 14.047586 | 3.014412 | 4.916442 | 8.333313 | 14.628864 |
| 11 | 2.732926 | 4.543978 | 7.836843 | 13.960130 | 2.980325 | 4.871362 | 8.273304 | 14.548171 |
| 12 | 2.699166 | 4.499281 | 7.777177 | 13.879610 | 2.949035 | 4.829974 | 8.218192 | 14.474035 |
| 13 | 2.667882 | 4.457857 | 7.721858 | 13.804921 | 2.920090 | 4.791685 | 8.167192 | 14.405404 |
| 14 | 2.638708 | 4.419221 | 7.670244 | 13.735204 | 2.893142 | 4.756035 | 8.119696 | 14.341466 |
| 15 | 2.611355 | 4.382992 | 7.621829 | 13.669780 | 2.867913 | 4.722662 | 8.075221 | 14.281576 |
| 16 | 2.585590 | 4.348863 | 7.576204 | 13.608102 | 2.844191 | 4.691273 | 8.033382 | 14.225217 |

The unnormalized preamble output ($Z_{n,nca}$) has a mean $$E((Z_{n,nca})_i) = \frac{\sigma_{n,nca}}{\sqrt{2}} \xi_{i,W,N_{nca}}.$$

With $N_B$ preamble detection attempts we can thus form an estimate of $\sigma_{n,ca}$ using:

$$\sigma_{n,ca} = \frac{\sqrt{2}}{16 N_B} \sum_{j=1}^{N_B} \sum_{i=1}^{16} \frac{(Z_{n,nca})_{j,i}}{\xi_{i,W,N_{nca}}} \quad (5)$$

Figure 3:
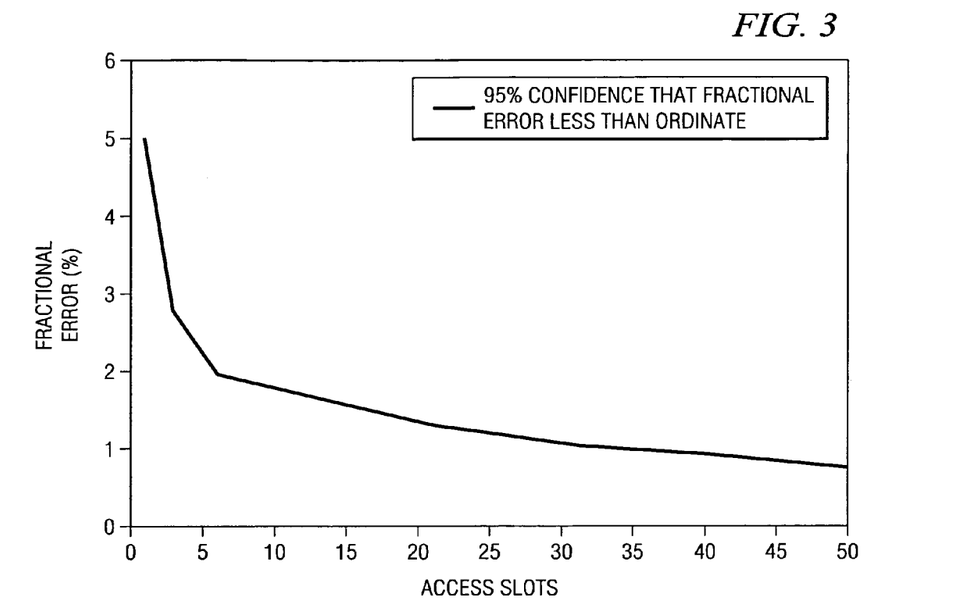
FIG. 3 illustrates a graph of the fractional error percentage versus access slots to produce a 95% that the factional error is less than the ordinate.

Preamble detector simulations show that such an estimator converges very rapidly without bias. FIG. 3 illustrates a graph of the fractional error percentage versus access slots to produce a 95% that the factional error is less than the ordinate. For example, assuming L=2 and W=512, FIG. 3 shows that $N_B$=6 access slots are enough for 95% confidence that the standard deviation estimate is within 2% of the actual. $N_B$=35 yields a 95% confidence that the estimate is within 1%.

The performance requirement of RACH for preamble detection is determined by the two parameters probability of false detection of the preamble $P_{FA}$ and the probability of detection of preamble $P_D$. The performance is measured by the required energy-per-chip to noise power spectral density ratio, $E_c/N_0$ at a probability of detection, $P_D$, of 0.99 and 0.999. $P_{FA}$ is defined as a conditional probability of erroneous detection of the preamble when input is only noise and interference. $P_D$ is defined as conditional probability of detection of the preamble when the signal is present. $P_{FA}$ should be $10^{-3}$ or less. Only one signature is used and it is known by the receiver.

$P_{FA}$ depends on the diversity combining method. Consider "selection diversity" and "diversity combining." With selection diversity, the length 16 sorted lists are taken from each antenna and concatenated. If any of the resulting 32 values exceeds the threshold, a detection is declared. With selection diversity, the equivalent search window is twice the search window used in each antenna. With diversity combining, the sorted length 16 lists are taken to see if particular offsets are in both lists. If so, the search values are added. A new list of length between 16 and 32 is formed with the combined results. If a particular offset is only observed in a single antenna, it is added as is to the new list. Each of the resultant samples is based on the single antenna search window. However, each sample, in the worst case assuming only noise is present, represents the non-coherent accumulation over twice the number of coherent packets used to generate the single antenna results. Table 2 generalizes the adjustments needed with multiple antennas.

TABLE 2

| Diversity Method | Equivalent Search Window $\hat{W}$ | Equivalent Number of Coherent Packets $\hat{N}_{nca}$ | Diversity Method Details |
|---|---|---|---|
| Diversity Combining | $\hat{W}$ | M $\hat{N}_{nca}$ | Combine results with common offsets |
| Selection Diversity | M$\hat{W}$ | $\hat{N}_{nca}$ | Concatenate lists |

$\hat{W}$ = single antenna search window size in offsets
$\hat{N}_{nca}$ = single antenna number of coherent packets We can use Beaulieu's approach to determine $P(Z_{n,nca})$ for a given value of $\hat{N}_{nca}$ and then $P_{FA}$ from:

$$P_{FA} = P(\text{all } Z_{n,nca} \leq \tau) = P(Z_{n,nca} \leq \tau)^{\hat{W}}$$

Figure 4:
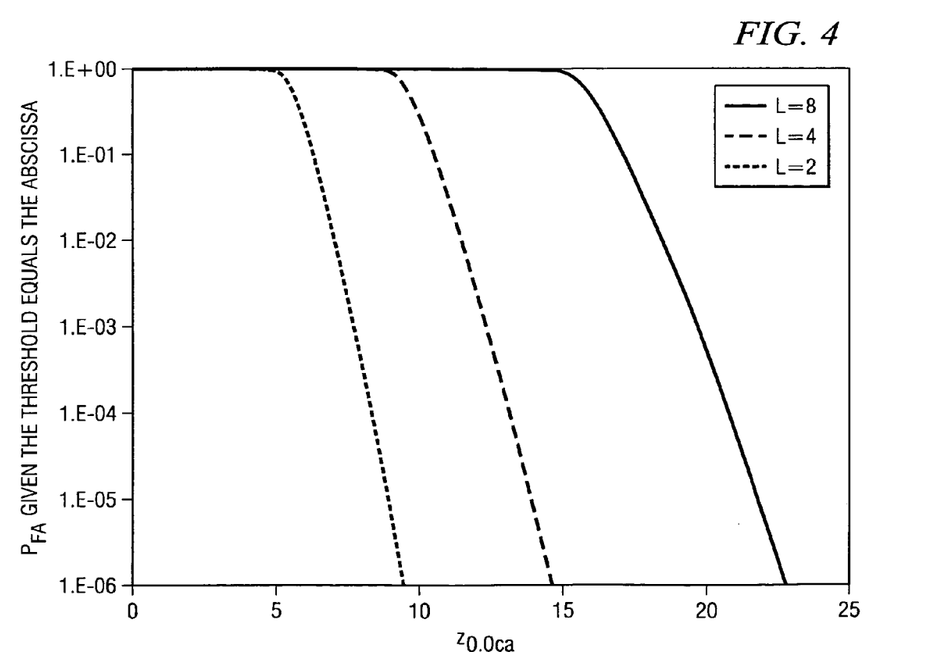
FIG. 4 illustrates a graph of the probability of false detection of the preamble $P_{FA}$ for several values of $L=\hat{N}_{nca}$ assuming $$\hat{W} = 512 \text{ and } \frac{\sigma^2_{n,nca}}{2} = 1;$$

FIG. 4 illustrates a graph of the probability of false detection of the preamble $P_{FA}$ versus $Z_{n,nca}$ for several values of L=$\hat{N}_{nca}$ assuming $$\hat{W} = 512 \text{ and } \frac{\sigma_{n,nca}^2}{\sqrt{2}} = 1.$$

FIG. 4 suggests that for $P_{FA}$<0.001, we'd need a detection threshold of 7.95, 12.40, and 20.09 for L=$\hat{N}_{nca}$=2, 4 and 8, respectively. Since $Z_{n,nca}$ scales directly with $\sigma_{n,ca}$, the results of FIG. 4 can be used for any value of $\sigma_{n,ca}$ assuming a constant value of $\hat{W}$. The detection threshold is simply $$7.95 \frac{\sigma_{n,ca}}{\sqrt{2}}, 12.40 \frac{\sigma_{n,ca}}{\sqrt{2}} \text{ and } 20.09 \frac{\sigma_{n,ca}}{\sqrt{2}} \text{ for } L = 2, 4, \text{ and } 8,$$

respectively, for instance in the FIG. 4 scenario.

In general, the detection threshold τ, is given by:

$$\tau = C_{\hat{N}_{nca},\hat{W}} \frac{\sigma_{n,ca}}{\sqrt{2}} \quad (6)$$

where $C_{\hat{N}_{nca},\hat{W}}$ is a fixed constant depending on $\hat{N}_{nca}$ and $\hat{W}$, for example given in Table 3 for $\hat{W}=512$ and $\hat{W}=1024$ and $\hat{N}_{nca}$ is 2, 4, 6 and 8.

TABLE 3

| $\hat{W} = 512$ | | | | $\hat{W} = 1024$ | | | |
|---|---|---|---|---|---|---|---|
| $\hat{N}_{nca} = 1$ | $\hat{N}_{nca} = 2$ | $\hat{N}_{nca} = 4$ | $\hat{N}_{nca} = 8$ | $\hat{N}_{nca} = 1$ | $\hat{N}_{nca} = 2$ | $\hat{N}_{nca} = 4$ | $\hat{N}_{nca} = 8$ |
| 5.104674 | 7.769179 | 12.155090 | 9.756381 | 5.221810 | 7.952168 | 12.398603 | 20.086897 |

Substituting Equation 5 into Equation 6 gives an estimate of the threshold:

$$\tau = \frac{1}{16 N_B} \sum_{j=1}^{N_B} \sum_{i=1}^{16} \frac{C_{\hat{N}_{nca},\hat{W}}(Z_{n,nca})_{j,i}}{\xi_{i,W,N_{nca}}} \quad (7)$$

The accuracy of this estimate is as accurate as the estimate $\sigma_{n,ca}$. For PD outputs from 10 access slots, we should have a great deal of confidence that the fractional error of our estimate is very small.

Roughly 10 samples (access slot, signature pairs) are required for statistical confidence. Thus, the following approach is proposed. For initialization of the first 10 samples t, form the threshold estimate using all t samples:

$$\tau = \frac{1}{16t} \sum_{j=1}^{t} \sum_{i=1}^{16} \frac{C_{\hat{N}_{nca},\hat{W}}(Z_{n,nca})_{j,i}}{\xi_{i,W,N_{nca}}}$$

Upon reaching equilibrium, form the instantaneous threshold estimate:

$$\tau = \frac{1}{16} \sum_{i=1}^{16} \frac{C_{\hat{N}_{nca},\hat{W}}(Z_{n,nca})_{j,i}}{\xi_{i,W,N_{nca}}}$$

and insert into infinite impulse response (IIR) filter:

$$\tau_k = (1-\alpha)\tau_{k-1} + \alpha\tau$$

where $\alpha = \frac{1}{4}$.

In an alternative to this invention, the power estimate could be used to estimate the standard deviation of the input interference in the preamble detector threshold selection. Let $x_n$ and $y_n$ be normal variables with zero mean and variance $\sigma^2$. It is well known that the sample mean $$Z = \frac{\sum_{n=1}^{N} x_n^2 + y_n^2}{N},$$

is the ML estimate (unbiased) of $2\sigma^2$.

The term $x_n^2 + y_n^2$ is the chi-squared with mean $2\sigma^2$ and variance $4\sigma^4$. Assuming that N is large, according to the central limit theorem Z is approximately normal with mean $2\sigma^2$ and variance $(4/N)\sigma^4$. The probability that Z is within a certain fractional error from the mean can then be estimated by:

$$p(|Z - 2\sigma^2| < \alpha 2\sigma^2) = 1 - 2p(Z - 2\sigma^2 > \alpha 2\sigma^2)$$

$$= 1 - 2p(Z > (\alpha + 1)2\sigma^2)$$

-continued $$= 1 - 2Q\left(\frac{(\alpha+1)2\sigma^2 - 2\sigma^2}{\sqrt{\frac{4}{N}\sigma^4}}\right)$$

$$= 1 - 2Q(\sqrt{N}\,\alpha)$$

Figure 5:
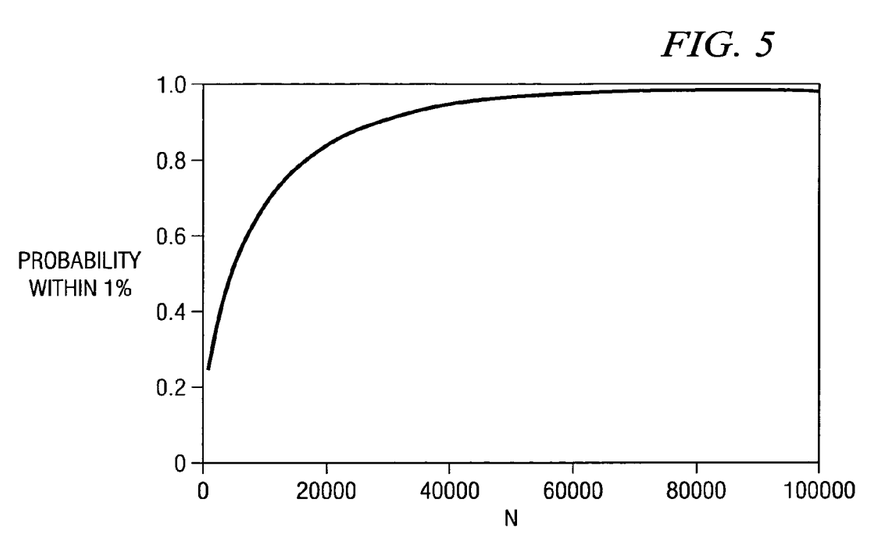
FIG. 5 illustrates a graph of the probability that the estimate has fractional error of 1% versus the number of samples N.
Figure 6:
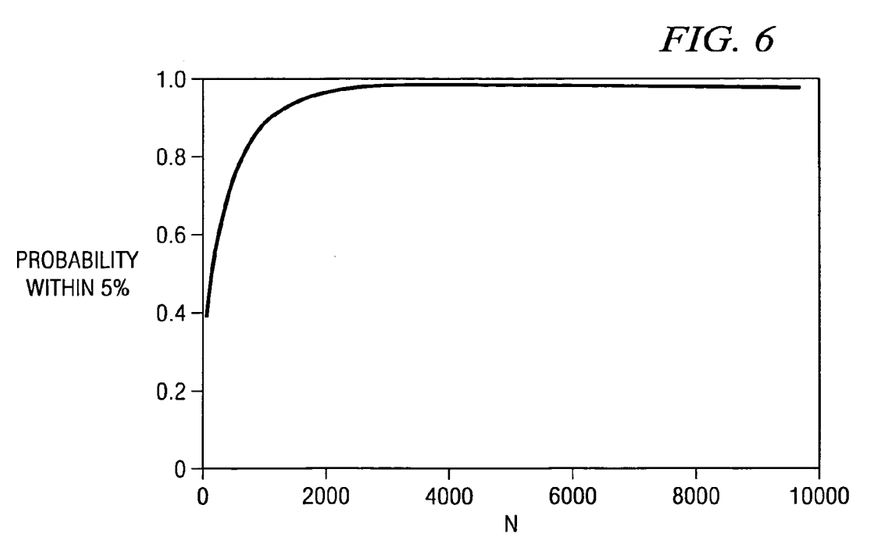
FIG. 6 illustrates a graph of the probability that the estimate has fractional error of 5% versus the number of packets N.

For instance, FIGS. 5 and 6 show the probability that the estimate has fractional error of 1 and 5%, respectively (e.g., for $\alpha=0.01$ and $\alpha=0.05$).

Figure 7:
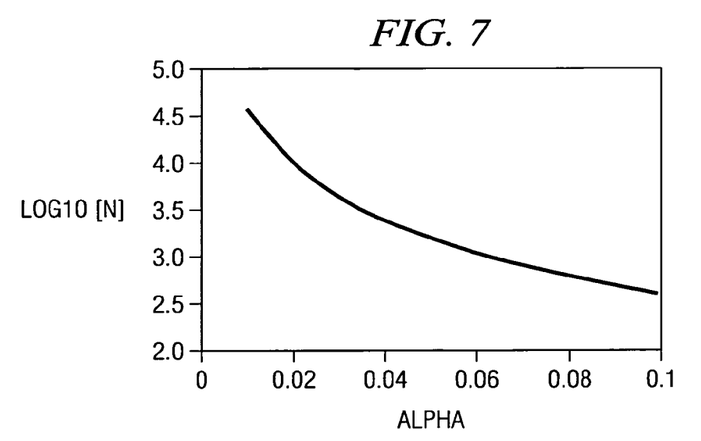
FIG. 7 illustrates a graph of the base 10 logarithm of the number of samples N versus α needed to achieve 95% confidence.

FIG. 7 illustrates the value of N on a logarithmic scale required to achieve 95% confidence, i.e., $p(|Z-2\sigma^2|<\alpha 2\sigma^2)=0.95$, as a function of $\alpha$.

Figure 8:
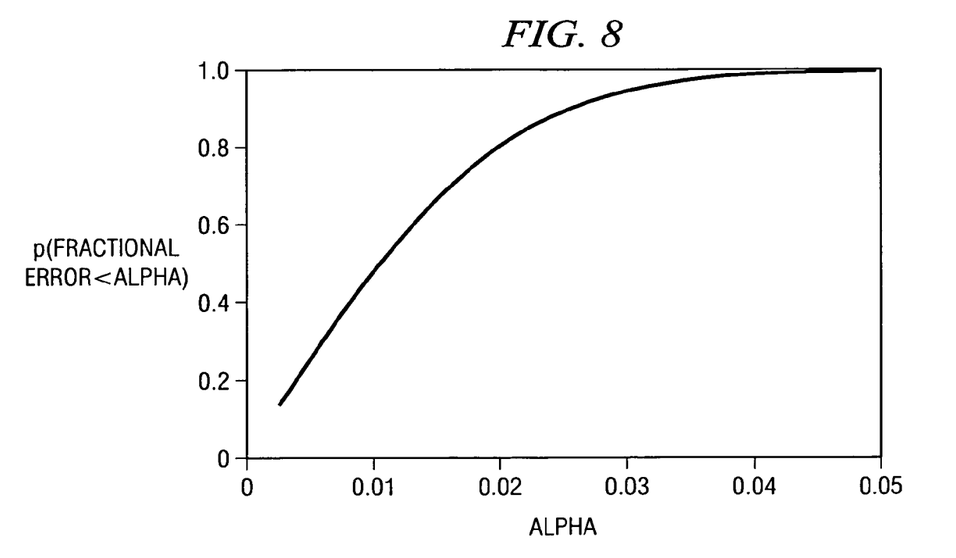
FIG. 8 illustrates a graph of the probability that the fractional error is less than α versus α for 4096 samples.

FIG. 8 illustrates the probability that the fractional error is less than a as a function of $\alpha$ for N=4096.

Applying the above results to estimate the input interference level, we set a goal of a confidence of 95% that the noise variance estimate has a fractional error relative to the actual within 1 to 2%. Simulations show that for N=4096, the error is within 1.2% only 56% of the time. An N of 26677 is required for 95% confidence. An N of 4096 yields 95% confidence that error is within 3%, 99% within 4%, and 99.9% within 5%. Given N=9603, 95% of the time the error is within 2%. For N=38414, 95% of the time the error is within 1%. Averaging over about 20000 samples or about 8 slots on generation of the noise estimate yields 95% confidence that the error is within 1.4%. Employing a number of samples of this order is advisable.

Implementation with power estimation is similar to that described above. Initialization of the first 80 256-chip PE outputs N, includes forming sample mean from PE outputs:

$$Z = \frac{\sum_{n=1}^{N} x_n^2 + y_n^2}{N}$$

and forming the detection threshold estimate from:

$$\tau = C_{\hat{N}_{nca},\hat{W}} \sqrt{\frac{4096}{N_{nca}} Z}$$

Upon equilibrium take the PE output Z and feed into infinite impulse filter (IIR) filter:

$$Z_k = (1-\alpha)Z_{k-1} + \alpha Z$$

where $\alpha=1/16$. The detection threshold is formed from:

$$\tau = C_{\hat{N}_{nca},\hat{W}}\sqrt{\frac{4096}{N_{nca}}Z}$$

What is claimed is:

1. A method of radio frequency message preamble detection comprising the steps of:
   receiving in-phase and quadrature input samples of a radio frequency message;
   coherently accumulating a first predetermined number of said in-phase and quadrature input samples;
   forming an absolute value of the coherently accumulated input samples;
   non-coherently combining a second predetermined number of said absolute values of said coherently accumulated input samples;
   selecting a preamble detection threshold $\tau$ according to the equation:

$$\tau = \frac{1}{16N_B}\sum_{j=1}^{N_B}\sum_{i=1}^{16}\frac{C_{\hat{N}_{nca},\hat{W}}(Z_{n,nca})_{j,i}}{\xi_{i,W,N_{nca}}}$$

where: $N_B$ is a number of preamble detection attempts; $C_{\hat{N}_{nca},\hat{W}}$ is a fixed constant depending on $\hat{N}_{nca}$ and $\hat{W}$; $\hat{N}_{nca}$ is an equivalent number of coherent packets; $\hat{W}$ is an equivalent search window; $(Z_{n,nca})_{j,i}$ is a non-coherently combined values; and $\xi_{i,W,N_{nca}}$ is an expected value of $(Z_{n,nca})_{j,i}$; and
   detecting a preamble in the radio frequency message employing said selected preamble detection threshold $\tau$.

2. The method of claim 1, wherein:
   said fixed constant $C_{\hat{N}_{nca},\hat{W}}$ is selected from the table:

| $\hat{W}=512$ | | | | $\hat{W}=1024$ | | | |
|---|---|---|---|---|---|---|---|
| $\hat{N}_{nca}=1$ | $\hat{N}_{nca}=2$ | $\hat{N}_{nca}=4$ | $\hat{N}_{nca}=8$ | $\hat{N}_{nca}=1$ | $\hat{N}_{nca}=2$ | $\hat{N}_{nca}=4$ | $\hat{N}_{nca}=8$ |
| 5.104674 | 7.769179 | 12.155090 | 9.756381 | 5.221810 | 7.952168 | 12.398603 | 20.086897 | according to the selected values of $\hat{W}$ and $\hat{N}_{nca}$.

3. The method of claim 1, wherein:
   said step of selecting said preamble detection threshold $\tau$ further includes
      selecting said preamble detection threshold $\tau$ for a first 10 samples t, from the threshold estimate using all t samples according to the equation:

$$\tau = \frac{1}{16t}\sum_{j=1}^{t}\sum_{i=1}^{16}\frac{C_{\hat{N}_{nca},\hat{W}}(Z_{n,nca})_{j,i}}{\xi_{i,W,N_{nca}}}$$

forming the preamble detection threshold $\tau$ for following samples according to the equation:

$$\tau = \frac{1}{16}\sum_{i=1}^{16}\frac{C_{\hat{N}_{nca},\hat{W}}(Z_{n,nca})_{j,i}}{\xi_{i,W,N_{nca}}}$$

modifying a preamble detection threshold $\tau_k$ according to the following infinite impulse response (IIR) filter:

$$\tau_k=(1-\alpha)\tau_{k-1}+\alpha\tau$$

where $\alpha=1/4$.

4. A method of radio frequency message preamble detection comprising the steps of:
   receiving in-phase and quadrature input samples of a radio frequency message;
   coherently accumulating a first predetermined number of said in-phase and quadrature input samples;
   forming an absolute value of the coherently accumulated input samples;
   non-coherently combining a second predetermined number of said absolute values of said coherently accumulated input samples;
   selecting a preamble detection threshold $\tau$ according to the equation:

$$\tau = C_{\hat{N}_{nca},\hat{W}}\sqrt{\frac{4096}{N_{nca}}Z}$$

where: $C_{\hat{N}_{nca},\hat{W}}$ is a fixed constant depending on $\hat{N}_{nca}$ and $\hat{W}$; $\hat{N}_{nca}$ is an equivalent number of coherent packets; $\hat{W}$ is an equivalent search window; and Z is a mean power estimate value calculated for a first 80 power estimate outputs of the 256-chip power estimate outputs N, by the equation:

$$Z = \frac{\sum_{n=1}^{N}x_n^2+y_n^2}{N}$$

where: $x_n$ and $y_n$ are the respective in-phase and quadrature input samples, and for following samples modified according to the following infinite impulse filter (IIR) filter:

$$Z_k=(1-\alpha)Z_{k-1}+\alpha Z$$

where $\alpha=1/16$.

5. The method of claim 4, wherein:
   said fixed constant $C_{\hat{N}_{nca},\hat{W}}$ is selected from the table:

| $\hat{W}= 512$ | | | | $\hat{W}= 1024$ | | | |
|---|---|---|---|---|---|---|---|
| $\hat{N}_{nca} = 1$ | $\hat{N}_{nca} = 2$ | $\hat{N}_{nca} = 4$ | $\hat{N}_{nca} = 8$ | $\hat{N}_{nca} = 1$ | $\hat{N}_{nca} = 2$ | $\hat{N}_{nca} = 4$ | $\hat{N}_{nca} = 8$ |
| 5.104674 | 7.769179 | 12.155090 | 9.756381 | 5.221810 | 7.952168 | 12.398603 | 20.086897 | according to the selected values of $\hat{W}$ and $\hat{N}_{nca}$.

\* \* \* \* \*